United States Patent Office 3,047,609
Patented July 31, 1962

3,047,609
BENZAZABOROXANES AND THEIR
PREPARATION
Ronald Swidler, Pasadena, Calif., assignor to Olin Mathieson Chemical Corporation, a corporation of Virginia
No Drawing. Filed Oct. 14, 1960, Ser. No. 62,533
29 Claims. (Cl. 260—462)

This invention relates to novel benzazaboroxanes and to a method for their preparation. More particularly this invention relates to novel benzazaboroxanes prepared by the reaction of phenol or a substituted-phenol, an aldehyde, an alkanolamine and boric acid or a trialkylborate ester. The process of this invention represents a unique method for synthesis of compounds in which boron is bound to three oxygen atoms. In contrast to all other processes reported in the prior art for the preparation of borates the process of this invention may be effected in mixed, aqueous solvent systems.

The novel benzazaboroxanes of this invention have the formula:

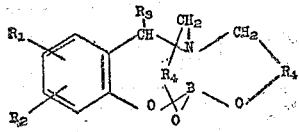

wherein $R_1$ is hydrogen, a hydroxy group or an alkyl group; $R_2$ is hydrogen, halogen, a hydroxy group, an alkyl group, an aryl group, a haloaryl group, an alkoxy group, a haloalkyl group, a carboxyl group, a p-hydroxydimethylbenzyl group or a $R_5$CONH— group in which $R_5$ is an alkyl group; $R_3$ is hydrogen or an alkyl group; $R_4$ is a —$CH_2$— group, a —$CH_2$—$CH_2$— group or a $CH_3$—$CH<$ group; and $R_1$ and $R_2$, when joined together and taken with the benzene ring to which they are attached, form a naphthalene group. The alkyl groups contain not more than 5 carbon atoms and include, for example, methyl, ethyl, propyl, isopropyl, butyl and amyl. The useful aryl groups contain not more than 8 carbon atoms and include, for example, phenyl, tolyl and xylyl. Useful halogens include chlorine, bromine and iodine.

The novel benzazaboroxanes of this invention can be prepared by reacting (A) phenol or a substituted-phenol, with (B) an aldehyde, and (C) an alkanolamine, and (D) boric acid or a trialkylborate ester. Equation 1 as given below illustrates the preparation of the novel benzazaboroxanes of this invention when boric acid is employed while Equation 2, also shown below, illustrates the same process when a trialkaylborate ester is substituted for boric acid.

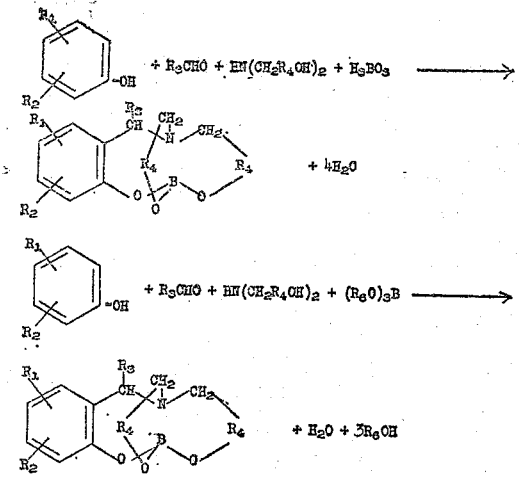

In Equations 1 and 2 above, $R_1$, $R_2$, $R_3$ and $R_4$ have the same meaning as previously defined and $R_6$ is an alkyl group containing not more than 5 carbon atoms which can be, for example, ethyl, methyl, propyl, amyl, etc. Substituted-phenol compounds useful as starting materials in the process of this invention include, for example, 4-hydroxydiphenyl, 2-chlorodiphenyl, 2,4-dihydroxydiphenyl, bis-phenol A, 2,4-dihydroxyphenyl-phenyldimethylmethane, 4-hydroxybenzoic acid, 2-hydroxybenzoic acid, 2,4-dihydroxybenzoic acid, 6-methylresorcinol, 4-chlorophenol, 2-ethoxyphenol, 2-bromomethylphenol, 4-chloroethylphenol, 3-chlorophenol, 6-chlororesorcinol, hydroquinone, resorcinol, p-cresol, 4-t-butylphenol, 6-tert.-butylresorcinol, 2-naphthol, 4-naphthol, 4-bromophenol, 3-bromophenol, 4-iodophenol. Dialkanolamines suitable as starting materials include diethanolamine, dipropylanolamine, and diisopropanolamine. Useful aldehydes include, for example, formaldehyde, acetaldehyde, propionaldehyde, etc. The reaction proceeds smoothly when phenol or a substituted-phenol, an aldehyde, a dialkanolamine and boric acid or a trialkylborate ester are admixed at temperatures of from about —20° C. up to about 100° C. The reaction time can be varied widely from about ½ to 10 hours or more depending upon the particular reactants and temperature employed.

The novel compounds of this invention possess exceptional resistance to hydrolysis and are useful as intermediates in organic syntheses, in paint compositions, in fuels for internal combustion engines, in fusel oil purification processes and in welding and brazing operations. In addition, the benzazaboroxanes of this invention are particularly useful in industry and for laboratory applications that require stable organic borates. These compounds are also useful as corrosion inhibitors, and for introducing boron in stable form into organic solutions as may be required in analytical procedures. Condensation of the hydroxybenzazaboroxanes of this invention with formaldehyde results in the formation of valuable resins.

This invention will be further illustrated by the following specific examples:

EXAMPLE I. — (3-HYDROXYBENZ[7,8])-1-AZA-5-BORO-4,6,12-TRIOXABICYCLO[4,3,3]-DODECANE

A solution of 24.0 g. of paraformaldehyde was prepared in 100 ml. of 100 percent ethanol containing 0.2 g. of potassium hydroxide. To this solution there was added 84 g. (0.8 mole) of diethanolamine in 50 ml. of 100 percent ethanol at such a rate as to maintain the temperature at 0° C. The resultant solution was cooled to —10° C. by means of a Dry Ice bath, and a solution of 88 g. (0.8 mole) of resorcinol in 100 ml. of 100 percent ethanol was added to it dropwise while the temperature was maintained at from —5° to —10° C. After the addition had been completed, 84 g. (0.8 mole) of trimethylborate was added to the above solution while the temperature was maintained at 0° C. The resulting mixture was gelatinous, but after 2 hours of stirring at room temperature a clear reaction mixture resulted. The solution was gently heated on a steam bath and crystallization commenced. After the solution has been left to stand overnight a large quantity of (3-hydroxybenz[7,8])-1-aza-5-boro-4,6,12-trioxabicyclo[4,3,3]-dodecane (A), the desired compound, had formed. This precipitate was collected, washed successively with methanol and ether, and dried in vacuo. A total of 132 g. (70 percent yield) of the desired compound was obtained which melted at 279–282° C. with decomposition. Recrystallization of the compound from aqueous isopropanol raised the melting point to 288–290° C.

The compound was analyzed for nitrogen and the following result was obtained.

Calcd. for $C_{11}H_{14}O_4BN$: N, 5.95. Found: N, 6.3.

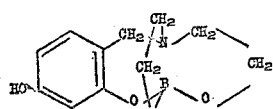

EXAMPLE II.—(4,5 - PHENYLBENZ[7,8] - 1-AZA-5-BORO - 4,6,12 - TRIOXABICYCLO[4,3,3] - DODECANE

A solution of 42 g. (0.4 mole) of diethanolamine in 30 ml. of 95 percent ethanol was added dropwise to a solution of 30 ml. of 37 percent (0.4 mole) of formaldehyde in 50 ml. of 95 percent ethanol, with vigorous stirring while the temperature was maintained at from 0° to —10° C. The resultant solution was stirred for an additional 5 minutes at 0° C. and then 57.6 g. (0.4 mole) of 2-naphthol was added. The mixture thus formed was stirred until the solution was homogeneous. To the clear yellow solution there was added 24.6 g. (0.4 mole) of boric acid, and the mixture was then heated on a steam bath. After 30 minutes the boric acid had dissolved, and after 2 hours, crystallization of the benzazaboroxane commenced. The mixture was removed from the steam bath and cooled in a refrigerator maintained at a temperature of 10° C. overnight. The solid was collected, washed with ether, and air-dried to give 92.5 g. (70 percent yield) of the desired compound (B), a white crystalline powder melting at 236–239° C.

The compound was analyzed for nitrogen and the following result was obtained.

Calcd. for $C_{15}H_{16}O_3BN$: N, 5.95. Found: N, 6.3.

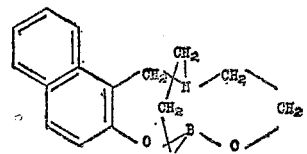

EXAMPLES III–XIII

Examples III–XIII were performed using the same procedure described in Examples I and II. The results obtained are set forth in Table 1 which follows.

Table 1.—Preparation of Benzazaboroxanes

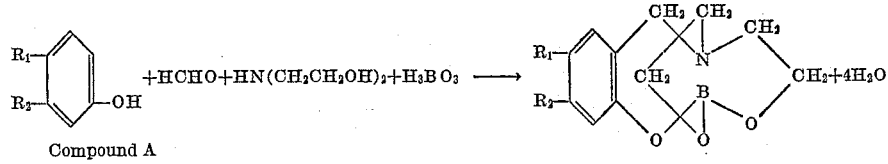

Compound A

| Example Number | Compound A | | Charge (g.) | | | | Melting Point [a] (° C.) | Yield Percent | Nitrogen Analysis [c] (Percent) | |
|---|---|---|---|---|---|---|---|---|---|---|
| | R₁ | R₂ | A | HCHO | HN(CH₂CH₂OH)₂ | H₃BO₃ | | | Theory | Found |
| III | H | H | 37.6 | 12.0 | 42.0 | 24.6 | 224–225 | [d] 19 | 6.4 | 6.35 |
| IV | C₆H₅– | H | 68.0 | 12.0 | 42.0 | 24.6 | 282 | [e] 39 | 4.75 | 4.8 |
| V [b] | HO–C₆H₄–C(CH₃)₂– | H | 91.3 | 12.0 | 42.0 | 24.6 | 287–288 | [f] 38 | 3.97 | 3.7 |
| VI [b] | COOH | H | 55.3 | 12.0 | 42.0 | 24.6 | 328 d. | [g] 31 | 5.3 | 5.2 |
| VII | CH₃ | OH | 50.0 | 12.0 | 42.0 | 24.6 | 305 d. | [h] 60 | 5.65 | 5.9 |
| VIII [b] | Cl | H | 51.5 | 12.0 | 42.0 | 24.6 | 240–241 | [i] 36 | 5.5 | 5.6 |
| IX | HO | H | 44.0 | 12.0 | 42.0 | 24.6 | 308 d. | [j] 73 | 5.95 | 6.3 |
| X | H | OH | 44.0 | 12.0 | 42.0 | 24.6 | 288–290 d. | [k] 70 | 5.95 | 6.3 |
| XI | CH₃ | H | 43.2 | 12.0 | 42.0 | 24.6 | 225–226 | [h] 47 | 6.0 | 6.35 |
| XII | (CH₃)₃C– | H | 60.0 | 12.0 | 42.0 | 24.6 | 297–298 | [i] 52 | 5.1 | -------- |
| XIII | CH₃COHN– | H | 60.5 | 12.0 | 42.0 | 24.6 | 268–270 | [h] 23 | 10.2 | 9.5 |

[a] Melting points depend on rate of heating and tend to be indefinite due to sublimation or decomposition.
[b] In Examples V, VI, VIII the reaction mixtures were heated at reflux for from 4 to 6 hours.
[c] Determined by Dumas method. Sample ignited in the presence of copper acetate and potassium chlorate.
[d] Platelets from acetonitrile.
[e] Needles from acetonitrile.
[f] Rhombohedra from nitromethane.
[g] Staves from acetonitrile and water.
[h] Needles from 90 percent isopropanol.
[i] Platelets from 95 percent ethanol.
[j] Needles from water.
[k] Platelets from 60 percent isopropanol.

To 23.5 g. (0.1 mole) of (3-hydroxybenz[7,8])-1-aza-5-boro-4,6,12-trioxabicyclo[4,3,3]dodecane suspended in 100 ml. of water containing 0.1 g. of potassium hydroxide there was added 6 ml. of 37 percent (0.08 mole) of formaldehyde. The mixture was heated at reflux with vigorous stirring. After 20 minutes the suspended solid dissolved in the deep red solution and after 3 hours the odor of formaldehyde could not be detected. The solution was cooled and pH adjusted to 6 with lactic acid. A gelatinous precipitate formed which was collected, washed with 100 ml. of water and dried in vacuo to a constant weight of 26.1 g. The solid was then pulverized in a ball mill to yield resin A.

A mixture of 9 g. of resin A, 21.0 g. of powdered asbestos 0.15 g. or zinc stearate and 0.5 g. of a phenol-formaldehyde of the phenol-novolak type and 1.0 g. of hexamethylene tetramine was milled in a ball mill to a fine powder. Five gram samples of this powder were placed in a one-inch diameter button mold. The mold was placed on a press previously heated to 340° F. and a button was produced by pressing at 2500–5000 p.s.i. for a period of about 10 minutes. In this manner strong, hard buttons were produced.

A mixture of 23.5 g. (0.1 mole) of (3-hydroxybenz[7,8]-1-aza-5-boro-4,6,12 - trioxabicyclo[4,3,3]dodecane, 19 g. (0.02 mole) of phenol, 8.5 ml. of 37 percent (0.113 mole) formaldehyde and 0.05 g. of potassium hydroxide was prepared in 75 ml. of water. The mixture was heated at reflux with stirring and after about 4 hours the red solution became viscous. After 6 hours heating was discontinued and the pH adjusted to 6 with 20 percent lactic acid. After the water had been removed in vacuo, 26.1 g. of a glass-like, deep red resin remained. This solid was then pulverized in a ball mill to yield resin B.

A molding powder was prepared from resin B by ball milling to a fine powder 9.0 g. of resin B, 21.0 g. of powdered asbestos, 0.15 g. of zinc stearate, and 1.0 g. of hexamethylene tetramine. Buttons were prepared from this molding powder on a press under the same conditions previously described. Hard buttons which were considerable stronger than those obtained with resin A were produced.

What is claimed is:

1. A method for the preparation of benzazaboroxanes of the formula:

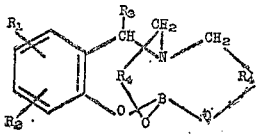

which comprises reacting a compound (A) of the formula

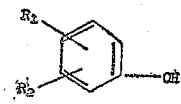

wherein $R_1$ taken individually is selected from the group consisting of hydrogen, hydroxy, and alkyl groups, $R_2$ taken individually is selected from the group consisting of hydrogen, halogen, hydroxyl, alkyl, alkoxy, haloalkyl, aryl, haloaryl, carboxyl, p-hydroxydialkylbenzyl and $R_5CONH$— groups wherein $R_5$ is an alkyl group, $R_1$ and $R_2$ taken collectively with the benzene ring to which they are joined form a naphthalene group, with (B) an aldehyde, and (C) an alkanolamine, and (D) a boron-containing compound, said aldehyde having the formula:

$$R_3CHO$$

wherein $R_3$ is selected from the group consisting of hydrogen and alkyl groups, said alkanolamine having the formula:

$$NH(CH_2R_4OH)_2$$

wherein $R_4$ is selected from the group consisting of —$CH_2$—, —$CH_2$—$CH_2$—, and $CH_3$—$CH<$ groups, said boron-containing compound being selected from the group consisting of boric acid and trialkyl borates of the formula $(R_6O)_3B$ wherein $R_6$ is an alkyl group, said alkyl group of the alkyl and alkyl-containing substituents of $R_1$, $R_2$, $R_3$, $R_5$ and $R_6$ having from 1 to 5 carbon atoms, said aryl group of the aryl and aryl-containing substituents of $R_2$ having not more than 8 carbon atoms, and said halogen group of the halogen and halogen-containing substituents of $R_2$ being selected from the group consisting of chlorine, bromine and iodine.

2. The method of claim 1 wherein the aldehyde is formaldehyde.

3. The method of claim 1 wherein the alkanolamine is diethanolamine.

4. The method of claim 1 wherein the boron-containing compound is boric acid.

5. A method for the preparation of 3-hydroxybenz[7,8])-1-aza-5-boro - 4,6,12 - trioxabicyclo[4,3,3] - dodecane which comprises reacting resorcinol with paraformaldehyde, diethanolamine and trimethylborate.

6. A method for the preparation of (4,5-phenyl [7,8])-1-aza-5-boro-4,6,12-trioxabicyclo[4,3,3]-dodecane which comprises reacting 2-naphthol with formaldehyde, diethanolamine, and boric acid.

7. A method for the preparation of (benz[7,8])-1-aza-5-boro-4,6,12-trioxabicyclo[4,3,3]-dodecane which comprises reacting phenol with formaldehyde, diethanolamine and boric acid.

8. A method for the preparation of (4-phenylbenz-[7,8])-1-azo-5-boro-4,6,12-trioxabicylo[4,3,3] - dodecane which comprises reacting 4-hydroxydiphenyl with formaldehyde, diethanolamine and boric acid.

9. The method for the preparation of 4(4'-hydroxydimethylbenzl)benz[7,8])-1-aza-5-boro-4,6,12 - trioxabicyclo[4,3,3]-dodecane which comprises reacting bisphenol A with formaldehyde, diethanolamine and boric acid.

10. The method for the preparation of (4-carboxylbenz[7,8])-1-aza-5-boro-4,6,12-trioxabicyclo[4,3,3] - dodecane which comprises reacting hydroxybenzoic acid with formaldehyde, diethanolamine and boric acid.

11. The method for the preparation of (3-hydroxy-4-methylbenz[7,8])-1-aza-5 - boro - 4,6,12 - trioxabicyclo-[4,3,3]-dodecane which comprises reacting 2,4-dihydroxytoluene with formaldehyde, diethanolamine and boric acid.

12. The method for the preparation of (4-chlorobenz-[7,8])-1-aza-5-boro-4,6,12-trioxabicyclo[4,3,3] - dodecane which comprises reacting 4-chlorophenol with formaldehyde, diethanolamine, and boric acid.

13. The method for the preparation of (4-hydroxybenz[7,8])-1-aza-5-boro-4,6,12-trioxabicyclo[4,3,3] - dodecane which comprises reacting hydroquinone with formaldehyde, diethanolamine and boric acid.

14. The method for the preparation of (4-methylbenz-[7,8])-1-aza-5-boro-4,6,12-trioxabicyclo[4,3,3] - dodecane which comprises reacting p-cresol with formaldehyde, diethanolamine, and boric acid.

15. The method for the preparation of (4-t-butylbenz-[7,8])-1-aza-5-boro-4,6,12-trioxabicyclo[4,3,3] - dodecane which comprises reacting 4-tert.-butylphenol with formaldehyde, diethanolamine and boric acid.

16. The method for the preparation of (4-acetamidobenz[7,8])-1-aza-5-boro-4,6,12-trioxabicyclo[4,3,3] - dodecane which comprises reacting 4-acetamidobenzene with formaldehyde, diethanolamine and boric acid.

17. Benzazaboroxanes of the formula:

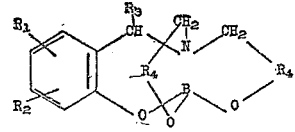

wherein $R_1$ taken individually is selected from the group consisting of hydrogen, hydroxy and alkyl groups, $R_2$ taken individually is selected from the group consisting of hydrogen, halogen, hydroxy, alkyl, alkoxy, haloalkyl, aryl, haloaryl, carboxyl, p-hydroxydialkylbenzyl and $R_5CONH$— groups wherein $R_5$ is an alkyl group, $R_1$ and $R_2$ taken collectively with the benzene ring to which they are joined form a naphthalene group, $R_3$ is selected from the group consisting of hydrogen and alkyl groups, and $R_4$ is selected from the group consisting of —$CH_2$—, —$CH_2$—$CH_2$— and $CH_3$—$CH<$ groups, said alkyl group of the alkyl and alkyl-containing substituents of $R_1$, $R_2$, $R_3$, $R_4$ and $R_5$ having from 1 to 5 carbon atoms, said aryl group of the aryl and aryl-containing substituents of $R_2$ having not more than 8 carbon atoms and said halogen group of the halogen and halogen-containing substituents of $R_2$ being selected from the group consisting of chlorine, bromine, and iodine.

18. (3-hydroxybenz[7,8])-1-aza-5-boro-4,6,12 - trioxabicyclo[4,3,3]-dodecane.

19. (4,5-phenylbenz[7,8])-1-aza-5-boro-4,6,12 - trioxabicyclo[4,3,3]-dodecane.
20. (Benz[7,8])-1-aza-5 - boro - 4,6,12 - trioxabicyclo[4,3,3]-dodecane.
21. (4-phenylbenz[7,8])-1-aza-5-boro-4,6,12 - trioxabicyclo[4,3,3]-dodecane.
22. 4(4'-hydroxydimethylbenzyl)benz[7,8]) - 1-aza-5-boro-4,6,12-trioxabicyclo[4,3,3]-dodecane.
23. (4-carboxylbenz[7,8])-1-aza-5-boro - 4,6,12-trioxabicyclo[4,3,3]-dodecane.
24. (3-hydroxy-4-methylbenz[7,8])-1-aza-5-boro - 4,6,12-trioxabicyclo[4,3,3]-dodecane.
25. (4-chlorobenz[7,8])-1-aza-5-boro - 4,6,12-trioxabicyclo[4,3,3]-dodecane.
26. (4-hydroxybenz[7,8])-1-aza-5-boro - 4,6,12-trioxabicyclo[4,3,3]-dodecane.
27. (4-methylbenz[7,8]-1-aza-5-boro-4,6,12 - trioxabicyclo[4,3,3]-dodecane.
28. (4-tert.-butylbenz[7,8])-1-aza-5 - boro - 4,6,12-trioxabicyclo[4,3,3]-dodecane.
29. (4 - acetamidobenz[7,8]-1-aza-5-boro - 4,6,12 - trioxabicyclo[4,4,3]-dodecane.

No references cited.